US011507775B2

(12) United States Patent
Viswanathan

(10) Patent No.: US 11,507,775 B2
(45) Date of Patent: Nov. 22, 2022

(54) METHOD AND APPARATUS FOR MATCHING HETEROGENEOUS FEATURE SPACES

(71) Applicant: HERE GLOBAL B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 195 days.

(21) Appl. No.: 16/210,844

(22) Filed: Dec. 5, 2018

(65) Prior Publication Data
US 2020/0184259 A1 Jun. 11, 2020

(51) Int. Cl.
G06K 9/62 (2022.01)
G06V 20/10 (2022.01)
G06V 20/58 (2022.01)
G06V 20/56 (2022.01)

(52) U.S. Cl.
CPC ........... G06K 9/6232 (2013.01); G06K 9/627 (2013.01); G06K 9/6215 (2013.01); G06V 20/182 (2022.01); G06V 20/582 (2022.01); G06V 20/588 (2022.01)

(58) Field of Classification Search
CPC ............. G06K 9/6232; G06K 9/00651; G06K 9/00798; G06K 9/00818; G06K 9/6215; G06K 9/627; G06V 20/182; G06V 20/582; G06V 20/588; G06V 10/7715; G06V 20/56
See application file for complete search history.

(56) References Cited

U.S. PATENT DOCUMENTS 7,466,841 B2   12/2008  Bahlmann et al.
9,251,140 B2    2/2016  Patman Maguire
9,443,494 B1 *  9/2016  Parish ..................... G09G 5/14
(Continued)

FOREIGN PATENT DOCUMENTS

EP    3300002 A1    3/2018
WO   03/085592 A1  10/2003

OTHER PUBLICATIONS

Liu et al., "Learning Robust Similarity Measures for 3d Partial Shape Retrieval", published online Oct. 1, 2009, 24 pages.

*Primary Examiner* — Qun Shen
(74) *Attorney, Agent, or Firm* — Ditthavong, Steiner & Mlotkowski

(57) ABSTRACT

An approach is provided for fully-automated learning to match heterogeneous feature spaces for mapping. The approach involves determining a first feature space comprising first features and a second feature space comprising second features, and classified by a feature detector into a first attribution category and a second attribution category, respectively. The approach further involves calculating a first similarity score for the first feature space based on a first distance metric applied to the first features, and a second similarity score for the second feature space based on a second distance metric applied to the second features. The approach also involves determining a transformation space comprising a first weight to be applied to the first similarity score and a second weight to be applied to the second similarity score based on matching the first attribution category and the second attribution category.

20 Claims, 11 Drawing Sheets

(56) References Cited

U.S. PATENT DOCUMENTS

| | | | | |
|---|---|---|---|---|
| 9,449,075 | B2* | 9/2016 | Liao | G06F 16/3322 |
| 10,096,381 | B1* | 10/2018 | McNair | G16H 50/70 |
| 10,395,117 | B1* | 8/2019 | Zhang | G01C 21/206 |
| 10,410,328 | B1* | 9/2019 | Liu | H04N 5/23229 |
| 2010/0088151 | A1* | 4/2010 | Kim | G06Q 30/0201 |
| | | | | 705/7.29 |
| 2012/0158746 | A1* | 6/2012 | Johnson | G09B 29/102 |
| | | | | 707/E17.014 |
| 2013/0129152 | A1* | 5/2013 | Rodriguez Serrano | |
| | | | | G06K 9/00791 |
| | | | | 382/105 |
| 2014/0039749 | A1* | 2/2014 | Jelbert | B60W 40/09 |
| | | | | 701/32.1 |
| 2015/0170385 | A1* | 6/2015 | Appleton | G06T 17/05 |
| | | | | 715/255 |
| 2015/0350844 | A1* | 12/2015 | Agarwal | H04W 4/029 |
| | | | | 455/456.2 |
| 2015/0363865 | A1* | 12/2015 | Ramanuja | G06Q 30/0631 |
| | | | | 705/26.62 |
| 2018/0025235 | A1* | 1/2018 | Fridman | G08G 1/096708 |
| | | | | 382/103 |
| 2019/0051153 | A1* | 2/2019 | Giurgiu | G08G 1/0112 |
| 2019/0129431 | A1* | 5/2019 | Yalla | G01C 21/00 |
| 2019/0311301 | A1* | 10/2019 | Pyati | G06F 16/901 |
| 2020/0073881 | A1* | 3/2020 | Sharma | G06N 20/10 |
| 2020/0126251 | A1* | 4/2020 | Viswanathan | G06K 9/03 |
| 2020/0385014 | A1* | 12/2020 | Hanniel | B60W 60/001 |

* cited by examiner

METHOD AND APPARATUS FOR MATCHING HETEROGENEOUS FEATURE SPACES

BACKGROUND

Conventionally, constructing a map from different data sources for autonomous driving includes pre-processing raw sensor data by an onboard perception system. The onboard perception system interprets the raw sensor data as attributed to certain pre-defined sensor categories, e.g., road lanes, road signs, poles, or any other terrain features. However, to match the data sources collected from different sensor sets, the semantic categories need to be compared and assigned a similarity score. Since different semantic categories are detected with varying distance metrics resulting in varying degrees of confidence and similarity scores, service providers face significant technical challenges in efficiently comparing these semantic categories.

Some Example Embodiments

Therefore, there is a need for an approach for transforming the differences in the confidence and similarity scores between different semantic categories of map feature to facilitate digital map mapping.

According to one embodiment, a method for generating a transformation space to compare feature spaces for digital map making comprises determining a first feature space comprising one or more first features detected from raw sensor data and classified by a feature detector into a first attribution category. The method also comprises determining a second feature space comprising one or more second features detected from the raw sensor data and classified by the feature detector into a second attribution category. The method further comprises calculating a first similarity score for the first feature space based on a first distance metric applied to the one or more first features, and a second similarity score for the second feature space based on a second distance metric applied to the one or more second features. The method also comprises determining the transformation space comprising a first weight to be applied to the first similarity score and a second weight to be applied to the second similarity score based on matching one or more combinations of the first attribution category and the second attribution category.

According to another embodiment, an apparatus for generating a transformation space to compare feature spaces for digital map making comprises at least one processor, and at least one memory including computer program code for one or more computer programs, the at least one memory and the computer program code configured to, with the at least one processor, cause, at least in part, the apparatus to determine a first feature space comprising one or more first features detected from raw sensor data and classified by a feature detector into a first attribution category. The apparatus is also caused to determine a second feature space comprising one or more second features detected from the raw sensor data and classified by the feature detector into a second attribution category. The apparatus is further caused to calculate a first similarity score for the first feature space based on a first distance metric applied to the one or more first features, and a second similarity score for the second feature space based on a second distance metric applied to the one or more second features. The apparatus is also caused to determine the transformation space comprising a first weight to be applied to the first similarity score and a second weight to be applied to the second similarity score based on matching one or more combinations of the first attribution category and the second attribution category.

According to another embodiment, a non-transitory computer-readable storage medium for generating a transformation space to compare feature spaces for digital map making carries one or more sequences of one or more instructions which, when executed by one or more processors, cause, at least in part, an apparatus to determine a first feature space comprising one or more first features detected from raw sensor data and classified by a feature detector into a first attribution category. The apparatus is also caused to determine a second feature space comprising one or more second features detected from the raw sensor data and classified by the feature detector into a second attribution category. The apparatus is further caused to calculate a first similarity score for the first feature space based on a first distance metric applied to the one or more first features, and a second similarity score for the second feature space based on a second distance metric applied to the one or more second features. The apparatus is also caused to determine the transformation space comprising a first weight to be applied to the first similarity score and a second weight to be applied to the second similarity score based on matching one or more combinations of the first attribution category and the second attribution category.

According to another embodiment, an apparatus for generating a transformation space to compare feature spaces for digital map making comprises means for determining a first feature space comprising one or more first features detected from raw sensor data and classified by a feature detector into a first attribution category. The apparatus also comprises means for determining a second feature space comprising one or more second features detected from the raw sensor data and classified by the feature detector into a second attribution category. The apparatus further comprises means for calculating a first similarity score for the first feature space based on a first distance metric applied to the one or more first features, and a second similarity score for the second feature space based on a second distance metric applied to the one or more second features. The apparatus also comprises means for determining the transformation space comprising a first weight to be applied to the first similarity score and a second weight to be applied to the second similarity score based on matching one or more combinations of the first attribution category and the second attribution category.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for fully-automated learning to match heterogeneous feature spaces for mapping are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
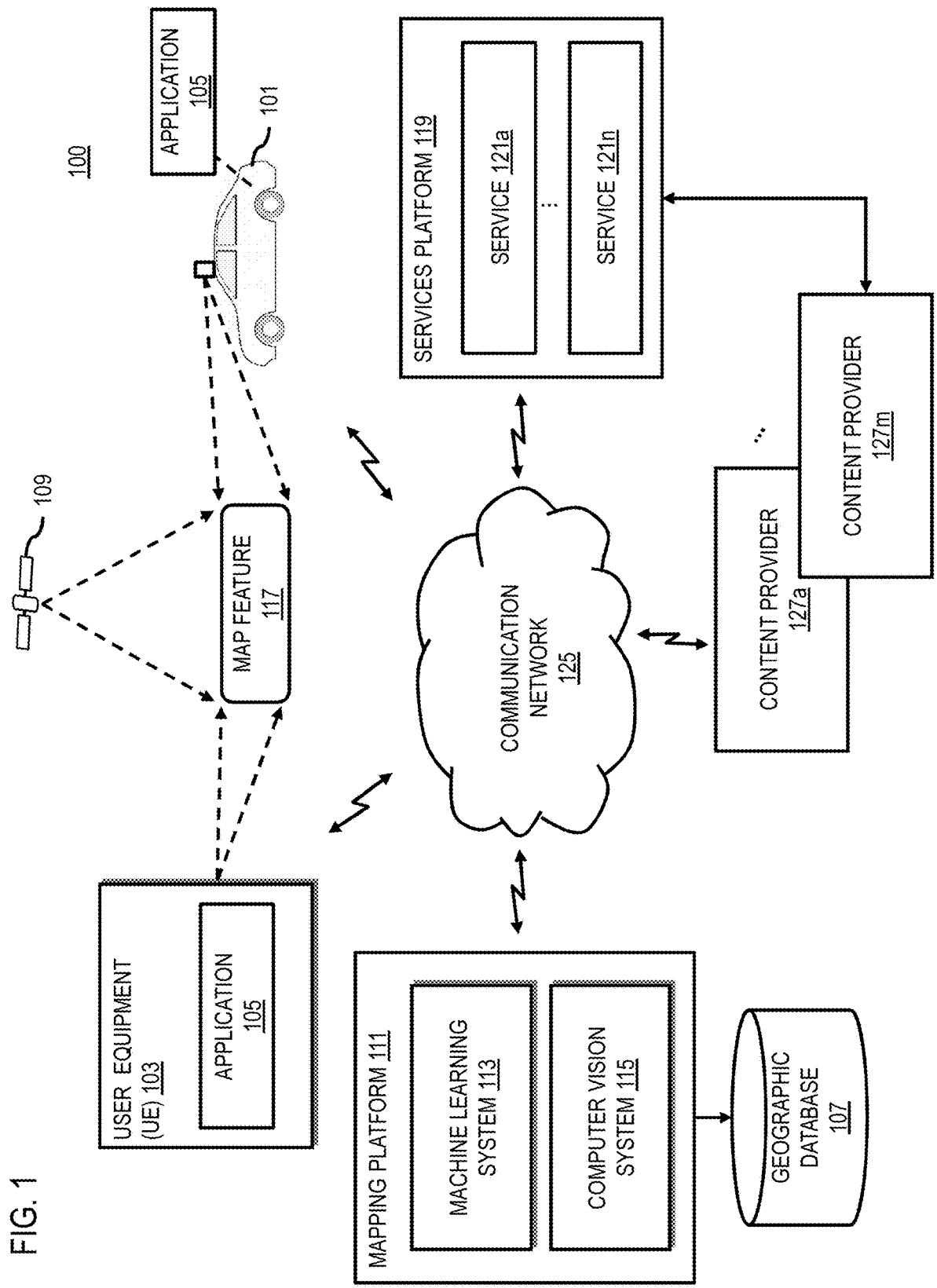
FIG. 1 is a diagram of a system capable of fully-automated learning to match heterogeneous feature spaces for mapping, according to one example embodiment.

FIG. 1 is a diagram of a system capable of fully-automated learning to match heterogeneous feature spaces for mapping, according to one embodiment. Generally, learning to construct a map from raw sensor data received from different data sources for autonomous driving includes pre-processing the raw sensor data by an onboard perception system to certain pre-defined sensor categories. In order to match the data sources collected from different sensor sets, the semantic categories need to be compared and assigned a similarity score. However, it is challenging to compare data belonging to different attribution categories because they are detected with varying degrees of confidence. In one example embodiment, a road lane may be detected with a higher confidence level whereas a road sign occluded by a tree may be detected with a lower confidence level. The magnitude of similarity metric as detected between lanes, e.g., as measured by the perpendicular distance between the lane segments, can be very different from the magnitude of the similarity metric as detected for signs, e.g., as measured by an overlap between signs. As a result, comparing different semantic types in a direct manner is challenging. A hand-tuned feature comparison may compare such different feature categories but is not efficient. In one example embodiment, a human-centric approach, e.g., human-in-the-loop, may compare such different feature categories but the approach is time-consuming and the scalability is limited.

Currently, different feature spaces are compared and the maximum combined score across such feature spaces is calculated. In one example embodiment, the perpendicular distance between two lanes is used as a distance metric for road lanes resulting in higher scores, whereas an overlap area is used as a distance metric for road signs resulting in lower scores. Thereafter, the scores/metrics are summed to identify the best possible alignment for the input feature spaces. However, such method results in higher scores from the road lanes completely overriding the lower scores from road signs, and as a consequence, the lower scores from road signs are observed simply as noise. Such overriding of lower scores can result in errors and misalignment of input feature spaces.

In one example embodiment, while comparing two observations using lanes and signs from a feature detector, the overall score function can be of the form:

Total score=max(lane score+sign score)

As discussed, in such cases, higher lane score dominates the lower sign score, resulting in the lower sign scores being completely discarded as noise in the data. Such calculations make it more challenging to efficiently compare feature spaces.

To address this problem, system 100 of FIG. 1 introduces the capability to automatically learn to compare different feature spaces by learning linear transforms, e.g., a direct linear transform (DLT) or equivalent, on the distance metric (or confidence/similarity scores derived therefrom) in each feature space. For example, the transform or transformation space is determined by searching over all possible subsets of matching feature-types and maximizing the likelihood of the overall match score. The optimal coefficients of the transformation space, e.g., parameter weights, are stored, e.g., in a geographic database 107 or equivalent, and used for all additional data sources that are to be processed.

In other words, in one embodiment, system 100 automatically assign similarity scores from large volumes of data, thereby overcoming the need to manually tune score function parameters to compare different feature categories. In another embodiment, system 100 describes an automated approach of machine-learning a transformation space, e.g., DLT or equivalent, based on similarity scores computed from different feature spaces. As described above, system 100 determines a transformation space by searching over all possible subsets of matching feature types and maximizing the likelihood of the overall similarity/match score. System 100 provides a framework wherein arbitrary feature categories are compared without worrying about the feature-processing/normalization steps. Furthermore, the framework scales effectively due to the discrete nature of the grid.

In one embodiment, mapping platform 111 may be a platform with multiple interconnected components. The mapping platform 111 may include multiple servers, intelligent networking devices, computing devices, components and corresponding software for fully-automated learning to match heterogeneous feature spaces for mapping. Though depicted as a separate entity in FIG. 1, it is contemplated that mapping platform 111 may be implemented as a module of any of the components of system 100, e.g., vehicle 101, UE 103, services platform 119, any of services 121a-121n of services platform 119, etc. The functions of mapping platform 111 are discussed with respect to FIGS. 2-8 below.

In one embodiment, mapping platform 111 provides an automated approach to machine-learn linear transforms, e.g., DLT or equivalent, by assigning weights, e.g., coefficients, to similarity scores computed for different feature-spaces. An optimal set of direct linear weights are learned by comparing all possible combinations of input feature spaces, e.g., determining similarity scores for features with the same attribution, determining similarity scores for the features with different attribution, or a combination thereof. The weights are then optimized such that for the case where the attribution is the same the weights maximize the total score, and when the attribution is incorrect, the weights minimize the total score. In one embodiment, mapping platform 111 performs a search-space optimization to determine the best set of weights from raw data. The optimized weights are then stored, and used for all additional data sources that are to be processed. Mapping platform 111 leverages data volumes to overcome manual tuning of score function parameters to compare different feature categories.

In one embodiment, mapping platform 111 determines a first feature space comprising one or more first features detected from raw sensor data and classified by a feature detector into a first attribution category. In another embodiment, mapping platform 111 determines a second feature space comprising one or more second features detected from the raw sensor data and classified by the feature detector into a second attribution category. In a further embodiment, mapping platform 111 calculates a first similarity score for the first feature space based on a first distance metric applied to the one or more first features, and a second similarity score for the second feature space based on a second distance metric applied to the one or more second features. In another embodiment, mapping platform 111 determines the transformation space comprising a first weight to be applied to the first similarity score and a second weight to be applied to the second similarity score based on matching one or more combinations of the first attribution category and the second attribution category. Mapping platform 111 scales effectively to arbitrary sized feature spaces, and learns the optimal set of direct linear coefficients given the discrete nature of the feature space.

Figure 2:
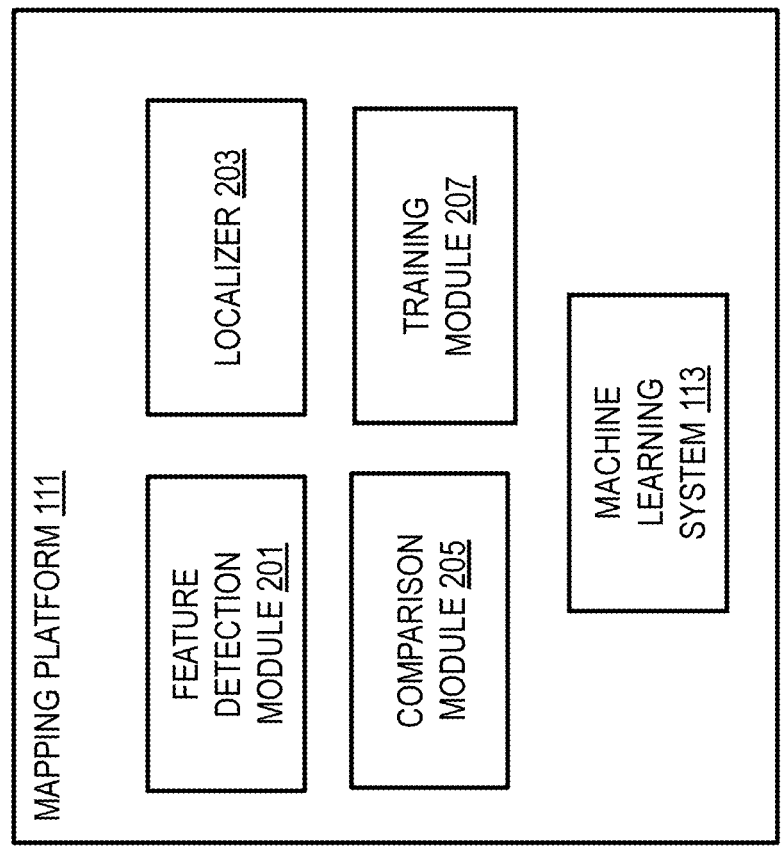
FIG. 2 is a diagram of the components of mapping platform, according to one example embodiment.

FIG. 2 is a diagram of the components of mapping platform, according to one embodiment. By way of example, mapping platform 111 includes one or more components for fully-automated learning to match heterogeneous feature spaces for mapping. It is contemplated that the functions of these components may be combined in one or more components or performed by other components of equivalent functionality. In this embodiment, mapping platform 111 includes feature detection module 201, localizer 203, comparison module 205, training module 207, and machine learning system 113. In another embodiment, one or more of modules 201-207 may be implemented as a cloud-based service, local service, native application, or a combination thereof. The above-presented modules and components of mapping platform 111 can be implemented in hardware, firmware, software, or a combination thereof.

In one embodiment, feature detection module 201 detects one or more features from raw sensor data. Feature detection module 201 detects any map feature that is visible in both top down and ground level imagery (or imagery from any perspectives or views of interest). The feature detection module 201 can use, for instance, the computer vision system 115 in combination with the machine learning system 113 (or equivalent) to recognize the pixels of the images that correspond to the visible feature. In another embodiment, feature detection module 201 classifies one or more detected features into one or more attribution categories. Feature detection module 201 selects a portion of the top down or ground level image that corresponds to a geographic area within a distance threshold from the ground level camera pose path. For example, in the example of FIG. 5, the feature detection module 201 can translate a real-world distance threshold, e.g., 50 meters, from the longitudinal axis of the trajectory 501 into a pixel coordinates of the top down image, and then select that portion of the top down image that includes the pixels corresponding to area from the trajectory 501 that is within the distance threshold. The feature detection module 201 then processes that portion of the top down image to identify one or more semantic features. Thereafter, feature detection module 201 classifies one or more semantic features into one or more attribution categories.

In one embodiment, localizer 203 translates the sensed geographic coordinates for the detected features indicated in a sensor data, e.g., image data, and/or map feature observation reports to specific locations represented in the digital map data. The detected feature can be any mappable feature of a geographic area including, but not limited to, road signs, road furniture, lane markings, nodes, links, etc. and/or any characteristics/attributes thereof. By way of example, localizer 203 can use any localization algorithm or process to register sensor data or reported feature observations to the digital map to determine location data, e.g., geographic coordinates, associated road links/nodes, etc., for the detected features. The localization algorithm, for instance, searches over several estimated vehicle poses, e.g., position and direction of the vehicle that collected/reported the raw sensor data/observation report of the detected feature. The localization algorithm then determines the best pose such that the measurements obtained from the reporting vehicle's sensor, e.g., measurements of the location/position of the detected feature, most agrees with the digital map. In one example embodiment, determining agreement with the map can include but is not limited to determining that the vehicle pose corresponds to the direction or heading of a road link or segment of the digital map. In one embodiment, the localization or registering of sensor data to the digital maps comprises lane-level localization of the detected features. In one example embodiment, lane-level localization refers to registering sensor data to individual lanes of multi-lane road links, e.g., a specific lane of a multi-lane highway, or to an accuracy equivalent to or capable of distinguishing a typical road lane width, e.g., 9-12 feet.

In one embodiment, comparison module 205 compares distance metric of the one or more feature spaces to determine similarity scores. In another embodiment, comparison module 205 compares one or more attribution categories to determine weights to be applied to the similarity scores. In one example embodiment, the total score is maximized based on the matching of the attribution categories, whereas the total score is minimized based on determining the combination one or more attribution category is incorrect.

In one embodiment, training module 207 trains machine learning system 113, e.g., a neural network, support vector machine, or equivalent, by obtaining a feature vector or matrix comprising the selected training features from feature detection module 201, localizer 203, and comparison module 205. During the training process, training module 207 feeds the feature vectors or matrices of the training dataset into machine learning system 113 to fully-automated learning to match heterogeneous feature spaces for mapping. In one example embodiment, training module 207 trains machine learning system 113 to a machine learning based approach to compare different feature spaces by linear transforms, e.g., DLT or equivalent, based on the distance metric as measured in each feature space. In order to do so, machine learning system 113 is provided with mapping data, sensor data, user defined inputs, and a query point. For example, vehicle orientation, vehicle speed, road attributes, road signs, terrain features, drivable surfaces or buildings, etc. can be used as input features for training the machine learning system 113.

Figure 3:
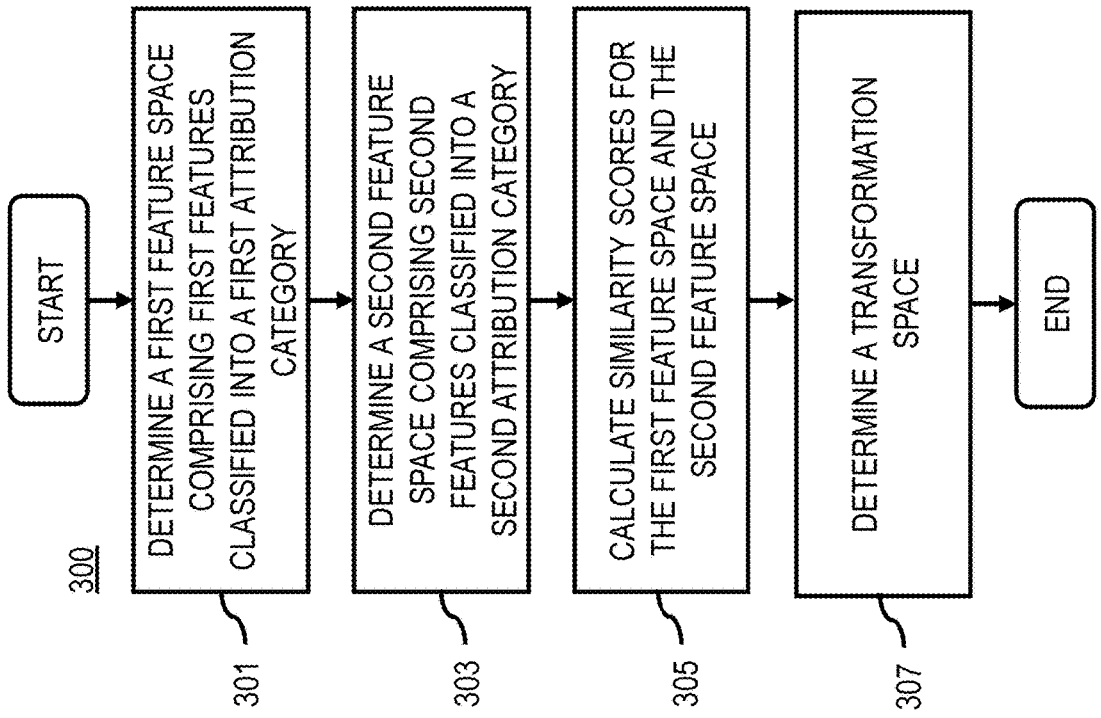
FIG. 3 is a flowchart of a process for fully-automated learning to match heterogeneous feature spaces for mapping, according to one example embodiment.
Figure 10:
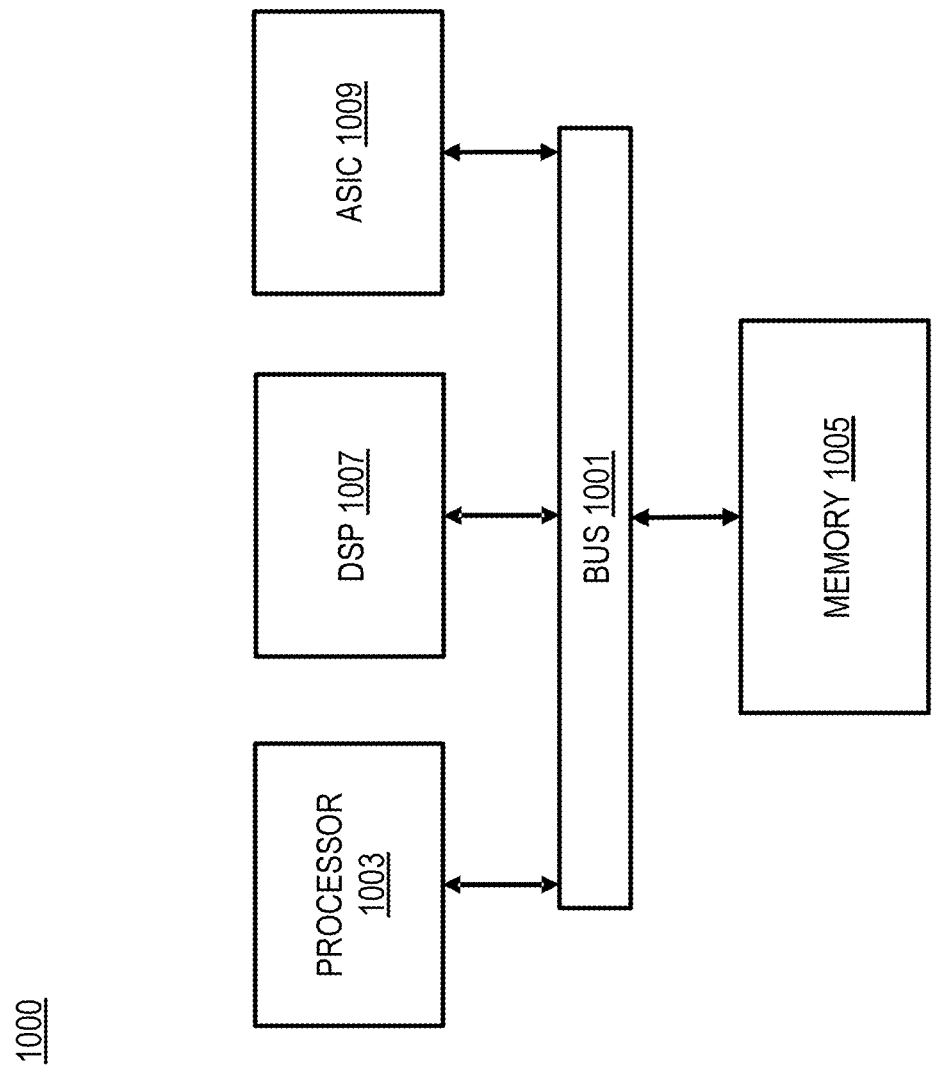
FIG. 10 is a diagram of a chip set that can be used to implement an embodiment of the invention.

FIG. 3 is a flowchart of a process for fully-automated learning to match heterogeneous feature spaces for mapping, according to one example embodiment. In one embodiment, mapping platform 111 performs the process 300 and is implemented in, for instance, a chip set including a processor and a memory as shown in FIG. 10. As such, mapping platform 111 and/or any of its component modules can provide means for accomplishing various parts of process 300, as well as means for accomplishing embodiments of other processes described herein in conjunction with other components of system 100. In addition, embodiments describing functions/actions related to mapping platform 111 individually is equally applicable to the other. Although process 300 is illustrated and described as a sequence of steps, its contemplated that various embodiments of process 300 may be performed in any order or combination and need not include all of the illustrated steps.

In step 301, mapping platform 111 determines a first feature space comprising one or more first features detected from raw sensor data and classified by a feature detector into a first attribution category. In one embodiment, a first feature space is a collection of features that are used to characterize raw data, e.g., features for a road segment includes road width, road length, speed limit, road signs, the distance between lanes, etc. Thereafter, the feature detection module 201 classifies these features detected from raw data into attribution categories, e.g., one or more lane lines are grouped together, one or more road signs are grouped together, etc.

In step 303, mapping platform 111 determines a second feature space comprising one or more second features detected from the raw sensor data and classified by the feature detector into a second attribution category. Similarly, a second feature space is a collection of features that are used to characterize raw data. The feature detection module 201 classifies these features detected from raw data into attribution categories.

In step 305, mapping platform 111 calculates a first similarity score for the first feature space based on a first distance metric applied to the one or more first features, and a second similarity score for the second feature space based on a second distance metric applied to the one or more second features. In one example embodiment, the distance metric may include but is not limited to a perpendicular distance, e.g., in a geometric sense, intersecting at a right angle (90 degrees), between the road lane segments or an overlap between the road signs. In one embodiment, mapping platform 111 searches for a plurality of subset of the first attribution category and the second attribution category in the first feature space and the second feature space, respectively, for similar features to maximize the total score. The search comprises a discrete grid search.

In step 307, mapping platform 111 determines the transformation space comprising a first weight to be applied to the first similarity score and a second weight to be applied to the second similarity score based on matching one or more combinations of the first attribution category and the second attribution category. In one embodiment, one or more weights are coefficients, e.g., w0 and w1, applied to the similarity scores of feature spaces. For example, optimal weights are determined by comparing all possible combinations of feature spaces, e.g., determining similarity scores for features with the same attribution, determining similarity scores for the features with different attribution, or a combination thereof. These weights adjust the magnitude of the similarity scores of feature spaces, resulting in an optimal total score. In another embodiment, mapping platform 111 processes the one or more first features, the one or more second features, or a combination thereof using the transformation space to create the digital map. In a further embodiment, the first weight and the second weight perform linear transforms, e.g., DLT or equivalent, of the first feature space and the second feature space.

In one embodiment, mapping platform 111 maximizes the total score based, at least in part, on the matching of the one or more combinations of the first attribution category and the second attribution category. In another embodiment, mapping platform 111 minimizes the total score based, at least in part, on determining the one or more combination of the first attribution category and the second attribution category is incorrect. In a further embodiment, mapping platform 111 automatically align the first feature space and the second feature space based, at least in part, on the total score. In another embodiment, mapping platform 111 stores the first weight, the second weight, indices of the aligned feature spaces, or a combination thereof for processing additional features detected from the raw sensor data.

Figure 4:
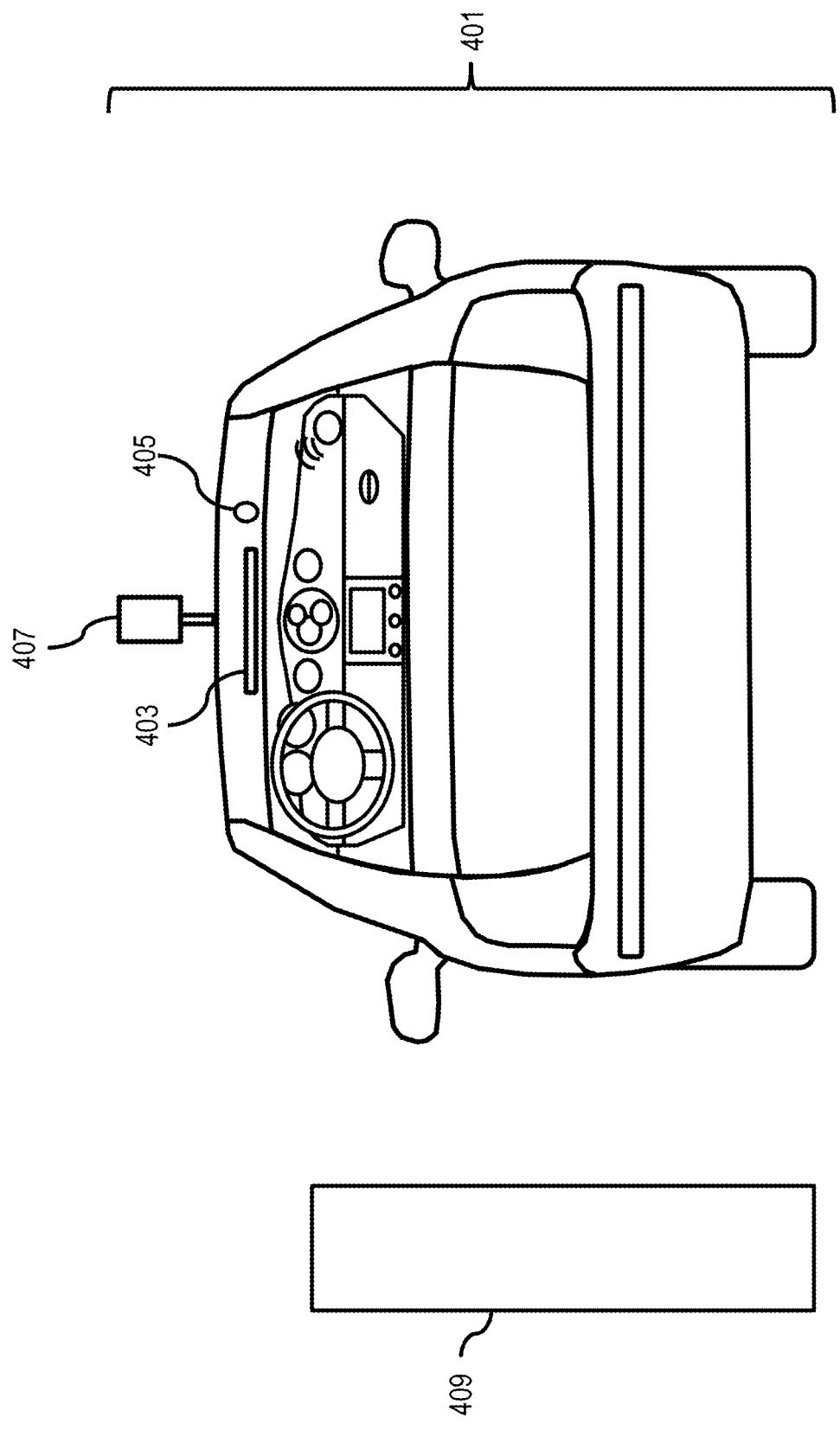
FIG. 4 is a diagram of a vehicle equipped with plurality of sensors to support the collection of training data for machine learning to match different feature spaces, according to one embodiment.

As illustrated in FIG. 4, a vehicle 401 is equipped with a plurality of sensors to support the collection of raw sensor data, according to one embodiment. As shown, vehicle 401 is equipped with a location sensor 403, e.g., a GPS receiver, and other sensors such as but not limited to a camera sensor 405 and LiDAR sensor 407. As vehicle 401 travels in an area being surveyed, vehicle 401 can initiate the capture of location data from the location sensor 403, image data from camera sensor 405, and three-dimensional mesh data from LiDAR sensor 407. As these vehicles drive and collect semantic information or sensor data in the geographic areas of interest, the semantic information or sensor data can be collected by feature detection module 201 of mapping platform 111.

In one embodiment, raw sensor data is first collected. Then, for each drive in the region or area of interest, feature detection module 201 can run the compute-intensive localizer, for instance, a grid-like pattern for each vehicle pose point to identify the corrected vehicle pose. In one embodiment, the computing resources needed by the compute-intensive localizer can vary with the grid-size, e.g., smaller grid sizes with more grid cells require more compute resources. Accordingly, the grid-size can be specified based on the available computing resources. By searching and computing offsets in this pattern, feature detection module 201 can identify or select the grid location associated with the highest probability of being the true location of the collection of the vehicle.

In one embodiment, raw sensor data can include streams from other data sources such as digital map data, e.g., HD maps of geographic database 107. For example, with respect to location sensors, the structural features, e.g., road signs or structures 409, or terrains can have a potential correlation with contextually relevant map data, e.g., structures obstructing the view of road signs on adjacent roads. Accordingly, in one embodiment, the feature detection module 201 can query geographic database 107 for map data corresponding to the respective location of the probe points. The map data then represents yet another data stream. In yet another embodiment, other types of data can also be included such as but not limited to weather data, sensor type, sensor manufacturer, vehicle characteristics, etc.

In one embodiment, after compiling the data streams into a dataset, feature detection module 201 can determine or retrieve relevant features, e.g., characteristics, attributes, properties, etc., of the compiled data. As used herein, relevant refers to any feature that has an effect or correlation with contextually relevant map data. For example, when the target sensor is a location or GPS sensor, features indicating the presence of structures capable of causing interference with road signs can potentially be relevant. The feature detection module 201, for instance, can process image data and/or structure data to determine the presence of lane markings, intersections, road signs, buildings, structures, terrain, etc. Similar data on structures can be extracted from other data streams such as the digital map data by identifying where the map data indicates the presence of any lane markings, intersections, road signs, buildings, structures, terrain, etc. within a threshold distance of the probe point location. For example, the digital map data can include three-dimensional (3D) models of nearby lane markings, intersections, road signs, buildings, structures, terrain, etc., that can be used as input features. It is noted that the example features discussed above are provided by way of illustration and not as limitations.

In one embodiment, the feature detection process also comprises converting the feature data into a suitable format, e.g., the features or data items can be converted into an input vector or matrix. Other examples of feature conversion can include but is not limited to: converting a text label to a Boolean flag; converting text labels to categorical labels; converting dates/times to a standardized format; normalizing or converting the extracted feature data into a common taxonomy or dictionary of terms; etc.

Figure 5:
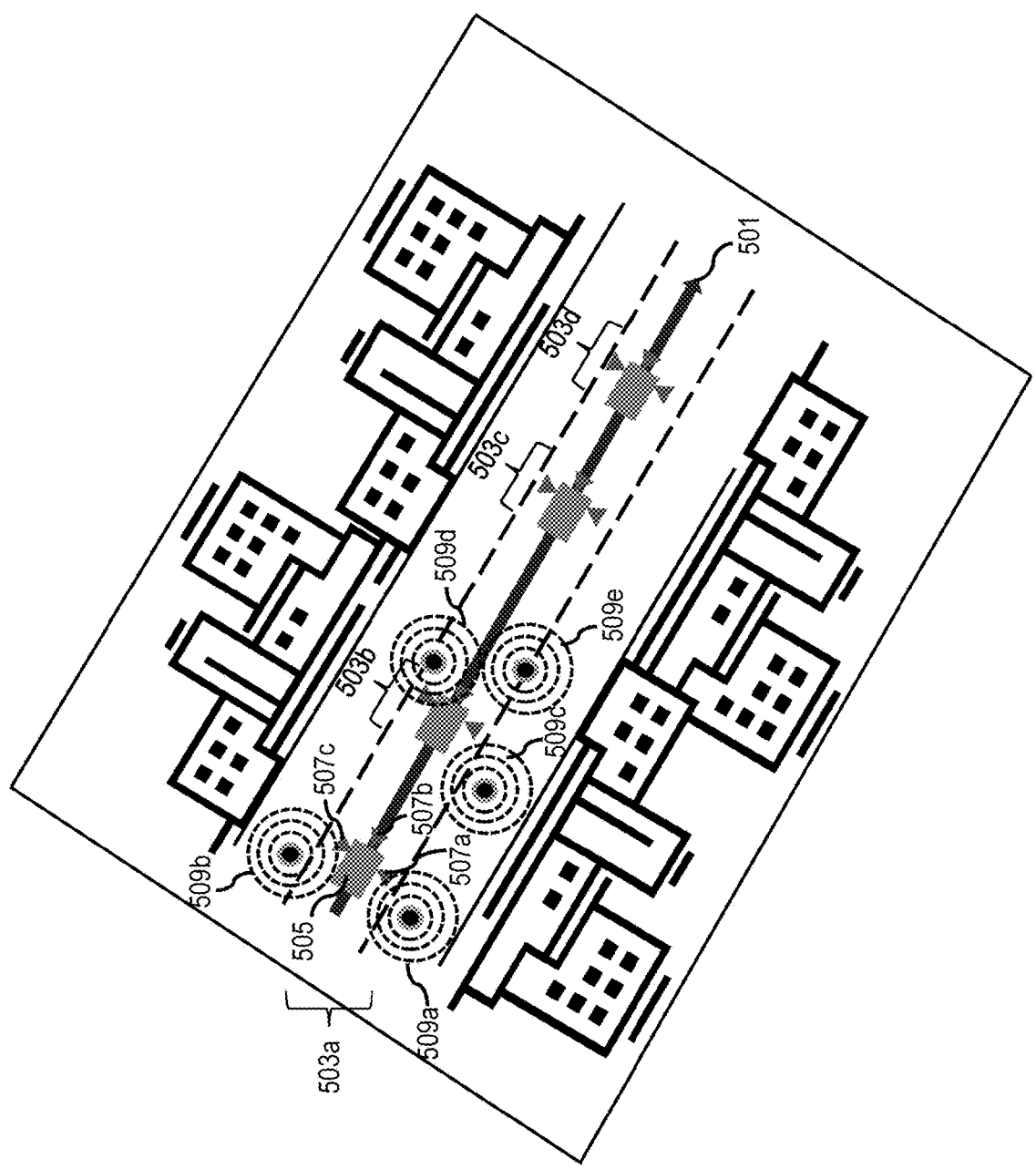
FIG. 5 is a diagram that represents a camera pose trajectory, according to one example embodiment.

FIG. 5 is a diagram that represents a camera pose trajectory, according to one example embodiment. As illustrated, the camera pose trajectory 501 includes a sequence of three probe points 503*a*-503*d* respectively indicating the position and heading of vehicle 505 on which three cameras 507*a*-507*c* are mounted so that camera 507*a* points directly to the right of the vehicle 505, camera 507*b* points directly to the front of the vehicle 505, and camera 507*c* points directly to the left of the vehicle 505. Therefore, the heading of vehicle 505 can be used to determine the individual headings or pointing directions of the cameras 507*a*-507*c*. In one embodiment, the camera mounting location and directions can be stored as metadata associated with camera pose trajectory 501. Alternatively, camera pose trajectory 501 can indicate a vehicle type or classification from which the number and mounting directions of the vehicle's cameras can be determined.

In this example embodiment, the concentric rings around each of the identified features 509*a*-509*e* represent their respective spheres of visibility. The camera poses or pointing directions of the cameras 507*a*-507*c* can then be evaluated to determine whether they fall with the spheres of visibility. As depicted, at the location of probe point 503*a*, cameras 507*a* and 507*c* fall within the sphere of visibility for features 509*a* and 509*b*, respectively. At probe point 503*b*, cameras 507*b* and 507*c* falls within the sphere of visibility of feature 509*d*. These identified camera poses on the trajectory can then be used for determining which ground level images to process for feature correspondence.

Figure 6:
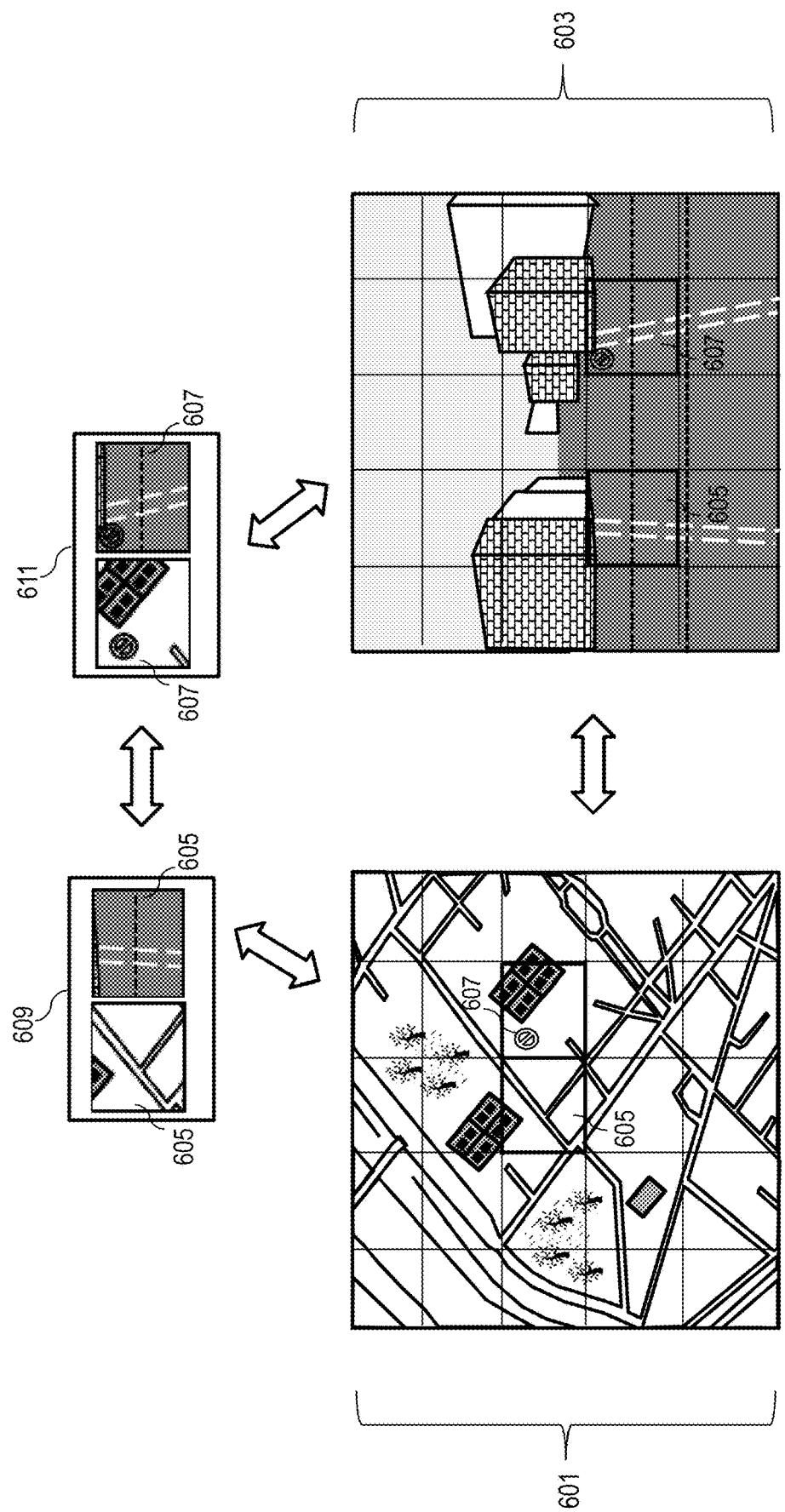
FIGS. 6 and 7 are diagrams that represent scenarios where different feature spaces of an image data are compared, according to one embodiment.

FIG. 6 illustrates an example of a set of top down image 601 from a first source, e.g., an aerial source such as a satellite 109, and a set of ground level image 603 from a second source, e.g., a ground level source such as a camera mounted on a vehicle 101 or a UE 103. In this example embodiment, top down image 601 and ground level image 603 depict the same map or semantic features, e.g., a crosswalk corner, road signs, etc., for a point of interest. By way of example, top-down imagery refers to images or image data that are captured from an overhead or aerial perspective so that the camera is pointed down towards the intersection or ground level from an overhead height. By way of example, ground-level imagery refers to images or image data captured while the camera is located at ground level or mounted on a vehicle or system that is located at ground level with the camera pointed towards the feature or object being captured.

In one embodiment, by knowing the camera model or pose, e.g., camera position, mount axis, pointing direction, field of view, focal length, etc., the pixel location of features 605 and 607 as depicted in each of images 601 and 603 can be translated to a real-world or ground location, e.g., expressed a geocoordinates comprising <latitude, longitude, elevation>. In other words, the known geolocation of the camera, e.g., camera latitude, longitude, elevation, can be used to translate the pixel location of features 605 and 607 in the image to real-world coordinates, e.g., the image-to-ground correspondence of features 605 and 607. Therefore, the accuracy of the location of the camera directly determines the accuracy of the image-to-ground correspondence of the features 605 and 607. The location of the camera is generally determined using location sensors of the system or component on which the camera is mounted, e.g., vehicle 101, UE 103, satellite 109. This variability in camera pose or camera model accuracy, in turn, can result in the images from each source having different location accuracy. For example, top down image 601 may have higher location accuracy or fidelity than ground level image 603 because the satellites 109 used to capture the top down image 601 typically have more accurate location sensors than ground level components, e.g., vehicle 101 and UE 103, used for capturing the ground level images 603.

In one embodiment, mapping platform 111 determines a first feature space 609 to compare at least one feature of images 601 and 603, e.g., top down view of road lane 605 of image 601 is compared to the ground level view of road lane 605 of image 603. In another embodiment, mapping platform 111 determines a second feature space 611 to compare at least one another feature of images 601 and 603, e.g., top down view of road signs 607 of image 601 is compared to ground level view of road signs 607 of image 603. Subsequently, mapping platform 111 may calculate similarity scores for first feature space 609 and second feature space 611 based, at least in part, on a distance metric. In one example embodiment, the distance metric may include but is not limited to a perpendicular distance, e.g., in a geometric sense, intersecting at a right angle (90 degrees), between the road lane segments or an overlap between the road signs. Thereafter, mapping platform 111 determines a transformation space wherein weights, e.g., coefficients w0 and w1, are applied to the similarity scores of first feature space 609 and second feature space 611 to correct their magnitude, determine a total score, and perform linear transforms, e.g., DLT or equivalent:

Total Score=(w0*lane score+w1*sign score)

In one embodiment, to learn best set of weights, mapping platform 111 compares similarity score for the features with same attribution, e.g., road lane 605 of image 601 is compared to road lane 605 of image 603, and road signs 607 of image 601 is compared to road signs 607 of image 603. In addition, mapping platform 111 compare features with different attribution, e.g., road lane 605 of image 601 to road signs 607 of image 603, for all possible combinations of the input feature space. Subsequently, the weights are optimized such that the total score is maximized when attribution is the same, and minimized when the attribution is (deliberately) incorrect. In one example embodiment, while the search for features with the same attribution is exhaustive over all possible feature attribution categories, it provides a discrete grid search framework and a discrete set of weights, e.g., coefficients w0 and w1, in the overall optimization. In one embodiment, this approach of determining the total score by applying weights to the similarity scores prevents the lane score from dominating the sign score and subsequent discarding of the sign score as noise in the data, e.g., the magnitude of the sign score is changed, e.g., increased, by adding weights to the sign score. Furthermore, the weights perform linear transforms, e.g., DLT or equivalent, of first feature space 609 and second feature space 611. The optimal weights are stored, and used for additional data sources that need to be processed. Subsequently, mapping platform 111 may process the one or more features using the transformation space to create a digital map.

Figure 7:
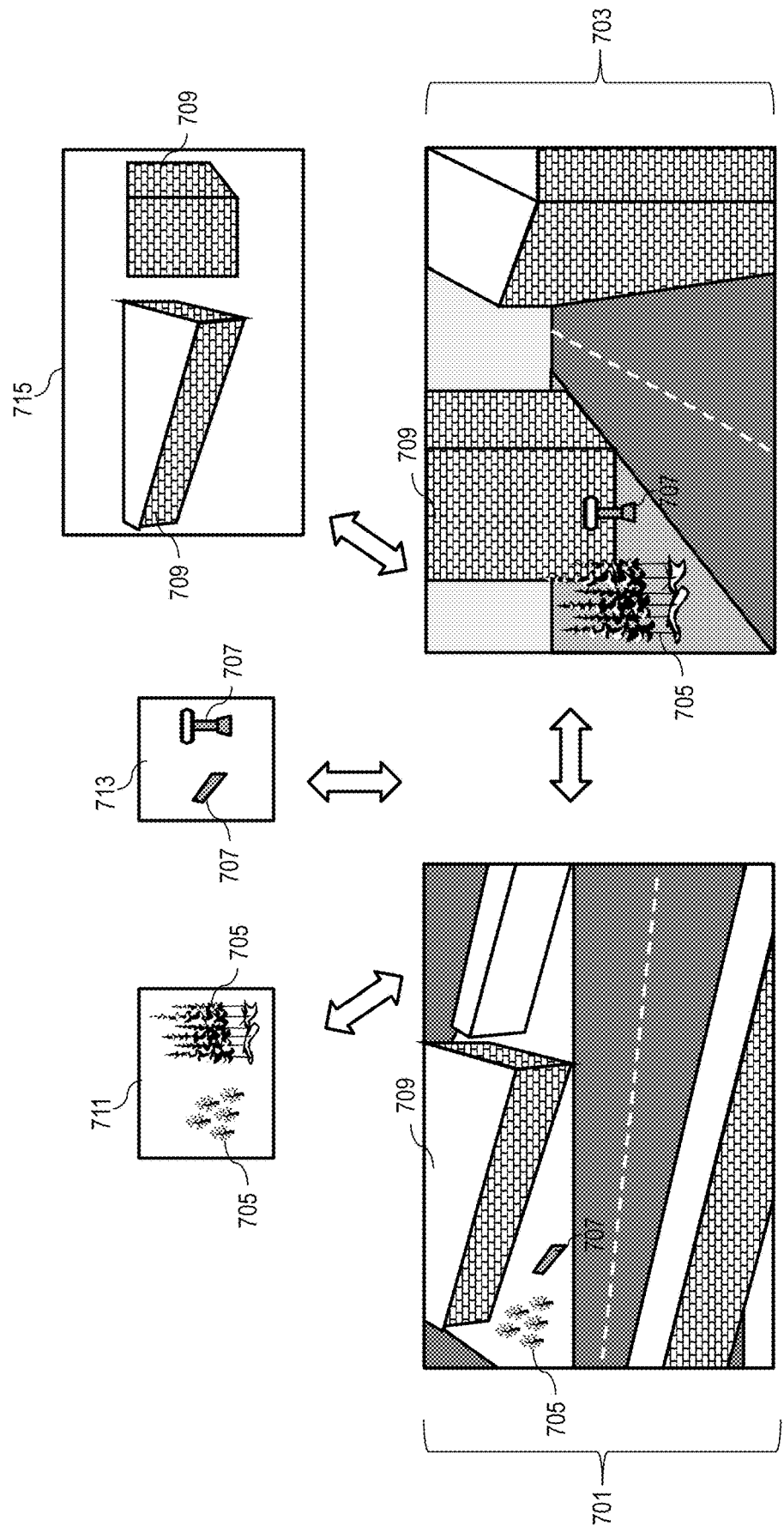

FIG. 7 illustrates an example of a top down image 701 and a ground level image 703 of a road segment, according to one example embodiment. In one embodiment, the top down image 701 may be generated from a first source, e.g., satellite 109, and ground level view 703 may be generated from a second source, e.g., a camera mounted on a vehicle 101 or a UE 103. In one embodiment, by knowing the camera model or pose the pixel location of features 705, 707, and 709 as depicted in each of images 701 and 703 can be translated to a real-world or ground location. In other words, the known geolocation of the camera can be used to translate the pixel location of features 705, 707, and 709 in the image to real-world coordinates.

In one embodiment, mapping platform 111 determines a first feature space 711 to compare at least one feature of images 701 and 703, e.g., top down view of roadside trees 705 of image 701 is compared to the ground level view of road-side trees 705 of image 703. In another embodiment, mapping platform 111 determines a second feature space 713 to compare at least one another feature of images 701 and 703, e.g., top down view of road lamp 707 of image 701 is compared to ground level view of road lamp 707 of image 703. In a further embodiment, mapping platform 111 determines a third feature space 715 to compare at least one additional feature of images 701 and 703, e.g., top down view of building 709 of image 701 is compared to ground level view of building 709 of image 703. Thereafter, mapping platform 111 calculates similarity scores for each feature spaces based, at least in part, on a distance metric. Subsequently, mapping platform 111 determines a transformation space wherein weights, e.g., coefficients w0, w1, and w2, are applied to the similarity scores of first feature space 711, second feature space 713, and third feature space 715. As discussed above, weights are optimized such that the total score is maximized when attribution is the same, and minimized when the attribution is (deliberately) incorrect, as represented hereinbelow:

Total Score=(w0*roadside trees score+w1*road lamp score+w1*building score)

These weights applied to the similarity scores corrects their magnitude, determines an optimal total score, and performs linear transforms, e.g., DLT or equivalent, of the first feature space 711, second feature space 713, and third feature space 715.

Returning to FIG. 1, vehicle 101 is any vehicles, e.g., an autonomous vehicle, equipped with a variety of sensors including but not limited to location sensors, e.g., configured to process signals from positioning satellites 109, e.g., a Global Positioning System (GPS) satellite, and other sensors, e.g., camera sensor, LiDAR sensor, RADAR sensor, etc., to assist in correctly localizing vehicle 101 on map 117. In one embodiment, accurate determination of vehicle 101's location on the map enables planning of a route, both on fine and coarse scales. On a coarse scale, navigation maps, e.g., a digital map provided from geographic database 107, allow vehicles 101 to know what roads to use to reach a particular destination. However, on a finer scale, digital maps allow vehicles 101 to know what lanes to be in and when to make lane changes, e.g., lane-level localization.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with the vehicle 101 or be a component part of the vehicle 101.

In one embodiment, the UE 103 and/or vehicle 101 may execute a software application 105 to capture image data or other observation data for determining feature correspondence or using feature correspondence according to the embodiments described herein. By way of example, the application 105 may also be any type of application that is executable on the UE 103 and/or vehicle 101, such as autonomous driving applications, mapping applications, location-based service applications, navigation applications, content provisioning services, camera/imaging application, media player applications, social networking applications, calendar applications, and the like. In one embodiment, the application 105 may act as a client for mapping platform 111 and perform one or more functions associated with generating feature correspondence from different image views alone or in combination with the machine learning system 113.

In one embodiment, UE 103 and/or vehicle 101 are configured with various sensors for generating or collecting environmental image data, e.g., for processing by mapping platform 111, related geographic data, etc. In one embodiment, the sensed data represent sensor data associated with a geographic location or coordinates at which the sensor data was collected. By way of example, the sensors may include a global positioning sensor for gathering location data, e.g., GPS, a network detection sensor for detecting wireless signals or receivers for different short-range communications, e.g., Bluetooth, Wi-Fi, Li-Fi, near field communication (NFC) etc., temporal information sensors, a camera/imaging sensor for gathering image data, e.g., the camera sensors may automatically capture ground control point imagery, etc. for analysis, an audio recorder for gathering audio data, velocity sensors mounted on steering wheels of the vehicles, switch sensors for determining whether one or more vehicle switches are engaged, and the like.

In one embodiment, communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network, e.g., the Internet, short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, mapping platform 111 has connectivity over a communication network 125 to services platform 119, e.g., an OEM platform, that provides one or more services 121, e.g., sensor data collection services. By way of example, services 121 may also be other third-party services and include mapping services, navigation services, travel planning services, notification services, social networking services, content, e.g., audio, video, images, etc., provisioning services, application services, storage services, contextual information determination services, semantic information determination services, location-based services, information-based services, e.g., weather, news, etc. In one embodiment, services platform 119 uses the output, e.g. contextual information priors, of machine learning system 113 to provide services such as navigation, mapping, other location-based services, etc.

In one embodiment, content providers 127a-127m (collectively referred to as content providers 127) may provide content or data, e.g., including geographic data, parametric representations of mapped features, sensor data, image data, map data, contextual information, semantic information, etc., to geographic database 107, mapping platform 111, services platform 119, services 121, and vehicle 101. The content provided may be any type of content, such as image content, map content, textual content, audio content, video content, etc. In one embodiment, content providers 127 may provide content that may aid in aligning one or more drive segments based on a consensus set of user defined inputs. In one embodiment, content providers 127 may also store content associated with geographic database 107, mapping platform 111, services platform 119, services 121, UE 103, and/or vehicle 101. In another embodiment, content providers 127 may manage access to a central repository of data and offer a consistent, standard interface to data, such as a repository of geographic database 107.

By way of example, mapping platform 111, services platform 119, services 121, vehicle 101, UE 103, and/or content providers 127 communicate with each other and other components of the communication network 125 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
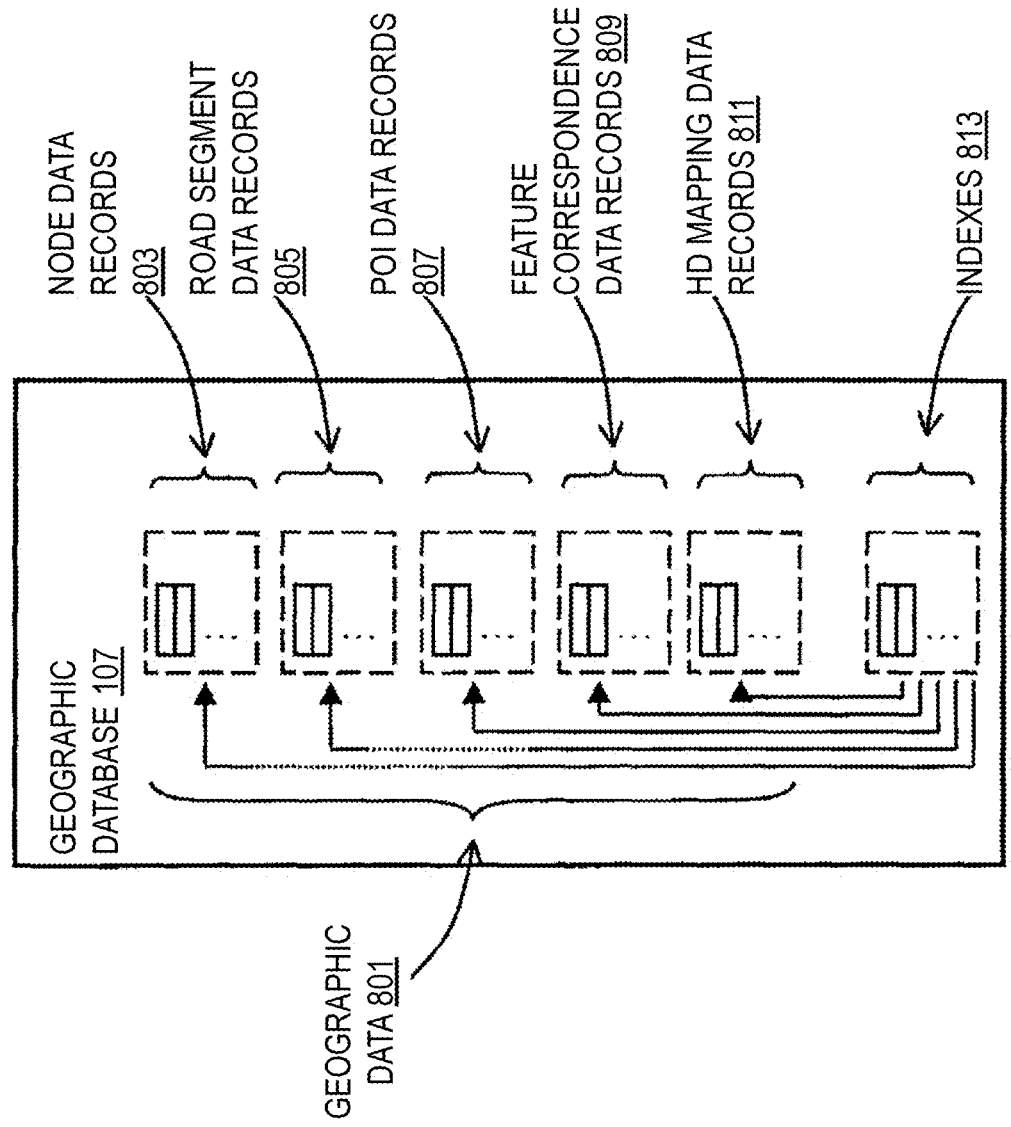
FIG. 8 is a diagram of a geographic database, according to one embodiment.

FIG. 8 is a diagram of a geographic database, according to one embodiment. In one embodiment, geographic database 107 includes geographic data 801 used for (or configured to be compiled to be used for) mapping and/or navigation-related services, such as for video odometry based on the mapped features, e.g., lane lines, road markings, signs, etc. In one embodiment, geographic database 107 includes high resolution or high definition (HD) mapping data that provide centimeter-level or better accuracy of map features. For example, geographic database 107 can be based on Light Detection and Ranging (LiDAR) or equivalent technology to collect billions of 3D points and model road surfaces and other map features down to the number lanes and their widths. In one embodiment, the HD mapping data, e.g., HD mapping data records 811, capture and store details such as the slope and curvature of the road, lane markings, roadside objects such as sign posts, including what the signage denotes. By way of example, the HD mapping data enable highly automated vehicles to precisely localize themselves on the road. In one embodiment, geographic database 107 includes the first weight applied to the first similarity score, the second weight applied to the second similarity score, total scores, indices of the aligned feature spaces, or a combination thereof for processing any additional features detected from the raw sensor data.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 107 follows certain conventions. For example, links do not cross themselves and do not cross each other except at a node. Also, there are no duplicated shape points, nodes, or links. Two links that connect each other have a common node. In geographic database 107, overlapping geographic features are represented by overlapping polygons. When polygons overlap, the boundary of one polygon crosses the boundary of the other polygon. In geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, geographic database 107 includes node data records 803, road segment or link data records 805, POI data records 807, feature correspondence data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in geographic database 107. In one embodiment, the indexes 813 may be used to quickly locate data without having to search every row in geographic database 107 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, geographic database 107 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 807. The geographic database 107 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, geographic database 107 can also include feature correspondence data records 809 for storing the identified feature correspondences, e.g., image-to-image correspondences, image-to-ground correspondences, etc., location corrected images, location corrected features, location corrected camera models/poses, as well as other related data used or generated according to the various embodiments described herein. By way of example, the feature correspondence data records 809 can be associated with one or more of the node data records 803, road segment data records 805, and/or POI data records 807 to support localization or visual odometry based on the features stored therein and the corresponding estimated quality of the features. In this way, the feature correspondence data records 809 can also be associated with or used to classify the characteristics or metadata of the corresponding records 803, 805, and/or 807.

In one embodiment, as discussed above, the HD mapping data records 811 model road surfaces and other map features to centimeter-level or better accuracy. The HD mapping data records 811 also include lane models that provide the precise lane geometry with lane boundaries, as well as rich attributes of the lane models. These rich attributes include, but are not limited to, lane traversal information, lane types, lane marking types, road signs, lane level speed limit information, and/or the like. In one embodiment, the HD mapping data records 811 are divided into spatial partitions of varying sizes to provide HD mapping data to vehicles 101 and other end user devices with near real-time speed without overloading the available resources of the vehicles 101 and/or devices, e.g., computational, memory, bandwidth, etc. resources.

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions, e.g., potholes, road friction, road wear, etc., with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, geographic database 107 can be maintained by the content provider 127 in association with the services platform 119, e.g., a map developer. The map developer can collect geographic data to generate and enhance geographic database 107. There can be different ways used by the map developer to collect data. These ways can include obtaining data from other sources, such as municipalities or respective geographic authorities. In addition, the map developer can employ field personnel to travel by vehicle, e.g., vehicle 101 and/or UE 103, along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for fully-automated learning to match heterogeneous feature spaces for mapping may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
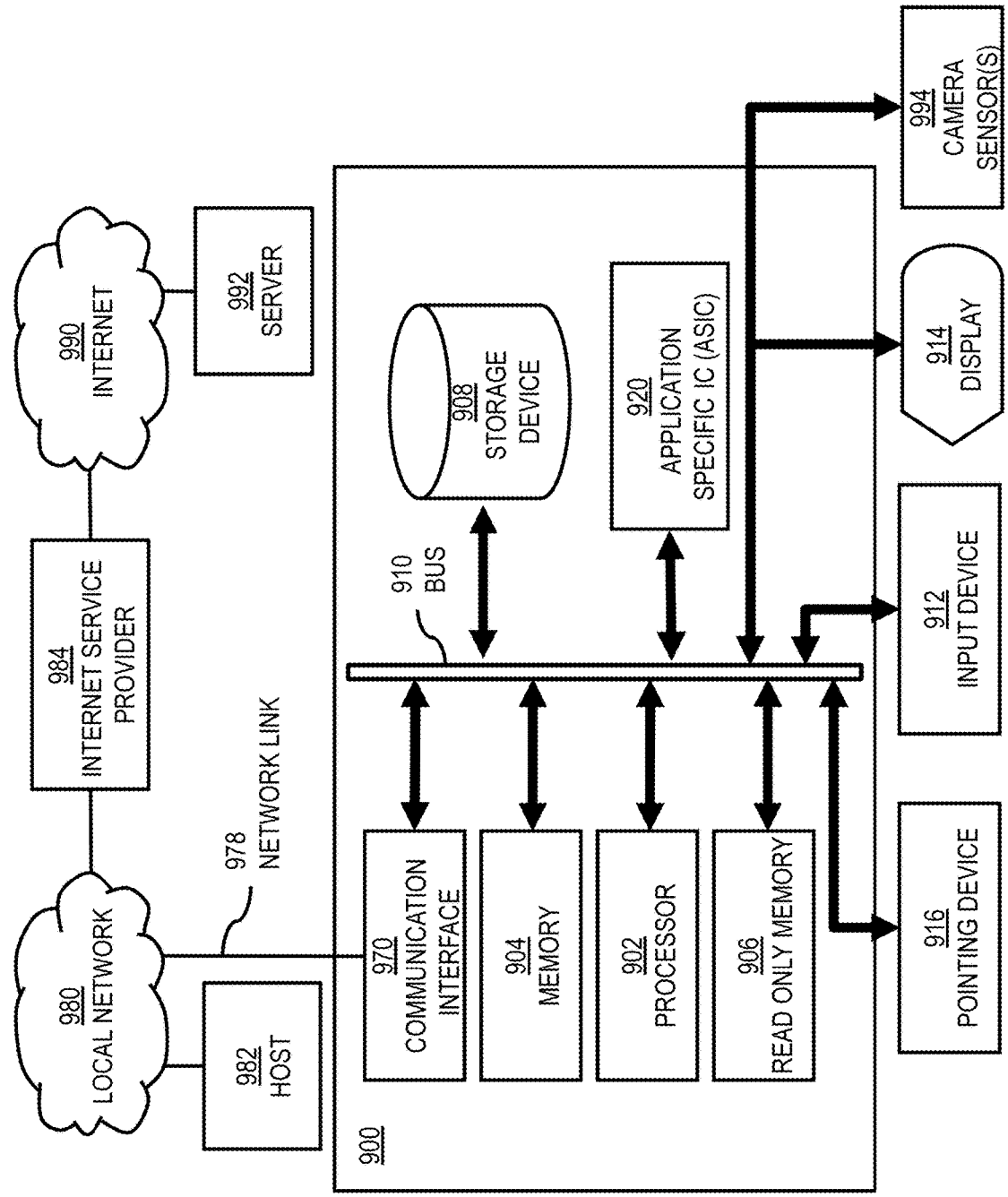
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to a fully-automated learning to match heterogeneous feature spaces for mapping as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of fully-automated learning to match heterogeneous feature spaces for mapping.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to a fully-automated learning to match heterogeneous feature spaces for mapping. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RANI) or any other dynamic storage device, stores information including processor instructions for fully-automated learning to match heterogeneous feature spaces for mapping. Dynamic memory allows information stored therein to be changed by the computer system 900. RANI allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for fully-automated learning to match heterogeneous feature spaces for mapping, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for fully-automated learning to match heterogeneous feature spaces for mapping to the UE 103.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer system 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to a fully-automated learning to match heterogeneous feature spaces for mapping as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of fully-automated learning to match heterogeneous feature spaces for mapping.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RANI, magnetic disk, writable optical disk, etc.) and static memory (e.g., ROM, CD-ROM, etc.) for storing executable instructions that when executed perform the inventive steps described herein to a fully-automated learning to match heterogeneous feature spaces for mapping. The memory 1005 also stores the data associated with or generated by the execution of the inventive steps.

Figure 11:
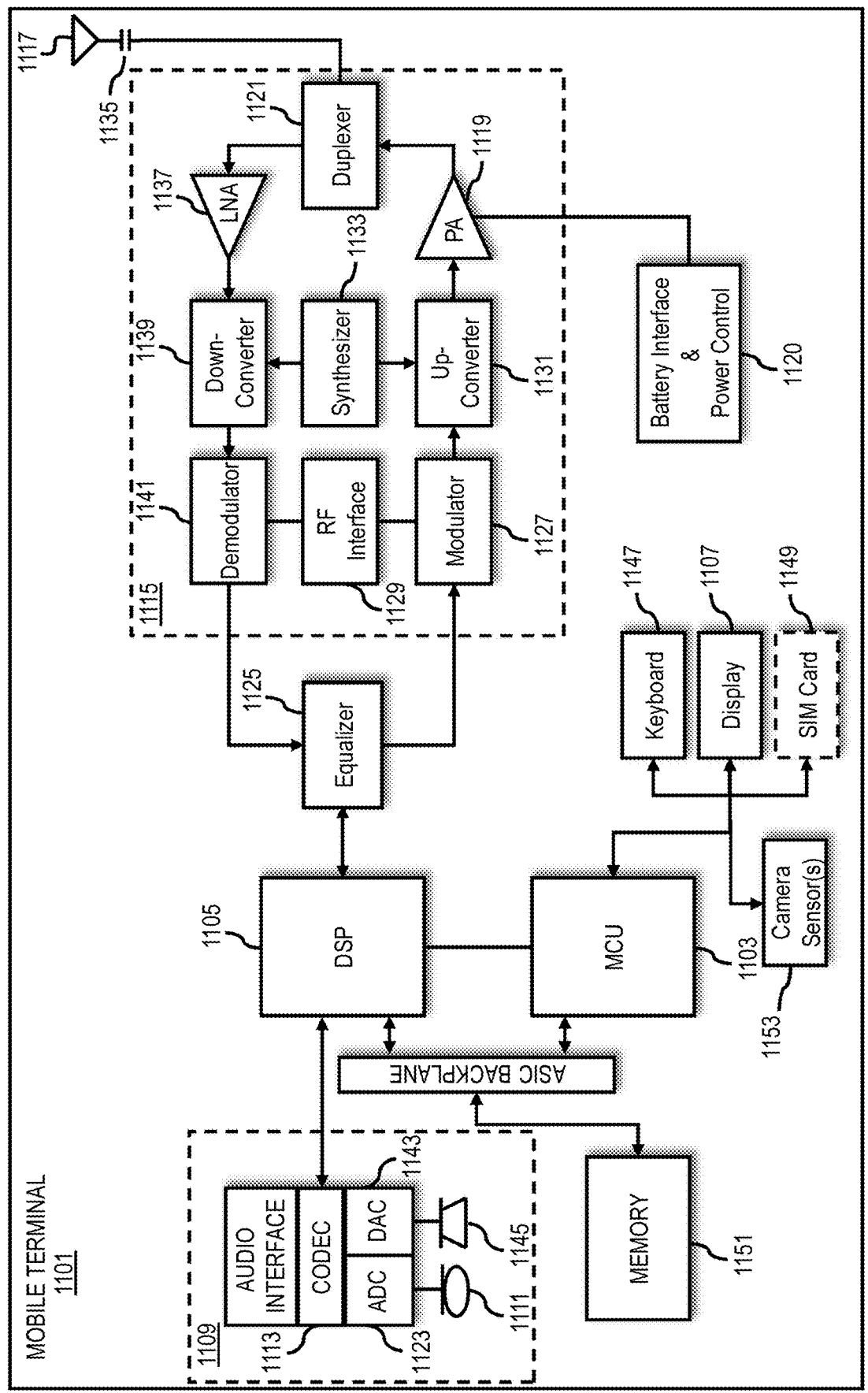
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of fully-automated learning to match heterogeneous feature spaces for mapping. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of fully-automated learning to match heterogeneous feature spaces for mapping. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to a fully-automated learning to match heterogeneous feature spaces for mapping. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RANI memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for generating a transformation space to compare feature spaces for digital map making comprising:
    determining a first feature space represented by a first vector or matrix comprising one or more first mappable geographic features of a geographic area detected from raw sensor data and classified by a feature detector into a first attribution category, wherein the one or more first mappable geographic features of the geographic area are stationary;
    determining a second feature space represented by a second vector or matrix comprising one or more second mappable geographic features of the geographic area detected from the raw sensor data and classified by the feature detector into a second attribution category, wherein the one or more second mappable geographic features of the geographic area are stationary;
    calculating a first similarity score for the first feature space based on a first distance metric applied to the one or more first mappable geographic features, and a second similarity score for the second feature space based on a second distance metric applied to the one or more second mappable geographic features; and
    determining the transformation space comprising a first weight to be applied to the first similarity score and a second weight to be applied to the second similarity score based on matching one or more combinations of the first attribution category and the second attribution category.

2. The method of claim 1, further comprising:
    processing the one or more first mappable geographic features, the one or more second mappable geographic features, or a combination thereof using the transformation space to create the digital map.

3. The method of claim 1, wherein the first weight and the second weight perform a direct linear transformation (DLT) of the first feature space and the second feature space.

4. The method of claim 1, further comprising:
    tuning the first weight, the second weight, or a combination thereof based, at least in part, on the first similarity score, the second similarity score, or a combination thereof.

5. The method of claim 4, wherein tuning the first weight and the second weight further comprising:
maximizing a total score based, at least in part, on the matching of the one or more combinations of the first attribution category and the second attribution category.

6. The method of claim 4, wherein tuning the first weight and the second weight further comprising:
minimizing the total score based, at least in part, on determining the one or more combination of the first attribution category and the second attribution category is incorrect.

7. The method of claim 6, further comprising:
automatically align the first feature space and the second feature space based, at least in part, on the total score.

8. The method of claim 7, further comprising:
storing the first weight, the second weight, indices of the aligned feature spaces, or a combination thereof for processing additional features detected from the raw sensor data.

9. The method of claim 1, wherein the first attribution category and the second attribution category comprises one or more lane lines, one or more road signs, terrain features, drivable surfaces, or a combination thereof.

10. The method of claim 1, wherein determining the transformation space further comprising:
searching for a plurality of subset of the first attribution category and the second attribution category in the first feature space and the second feature space, respectively, to maximize the total score, and wherein the search comprises a discrete grid search.

11. An apparatus for generating a transformation space to compare feature spaces for digital map making, comprising:
at least one processor; and
at least one memory including computer program code for one or more programs,
the at least one memory and the computer program code configured to, with the at least one processor, cause the apparatus to perform at least the following,
determine a first feature space represented by a first vector or matrix comprising one or more first mappable geographic features of a geographic area detected from raw sensor data and classified by a feature detector into a first attribution category, wherein the one or more first mappable geographic features of the geographic area are stationary;
determine a second feature space represented by a second vector or matrix comprising one or more second mappable geographic features of the geographic area detected from the raw sensor data and classified by the feature detector into a second attribution category, wherein the one or more first mappable geographic features of the geographic area are stationary;
calculate a first similarity score for the first feature space based on a first distance metric applied to the one or more first mappable geographic features, and a second similarity score for the second feature space based on a second distance metric applied to the one or more second mappable geographic features; and
determine the transformation space comprising a first weight to be applied to the first similarity score and a second weight to be applied to the second similarity score based on matching one or more combinations of the first attribution category and the second attribution category.

12. The apparatus of claim 11, further comprising:
process the one or more first mappable geographic features, the one or more second mappable geographic features, or a combination thereof using the transformation space to create the digital map.

13. The apparatus of claim 11, wherein the first weight and the second weight perform a direct linear transformation (DLT) of the first feature space and the second feature space.

14. The apparatus of claim 11, further comprising: tune the first weight, the second weight, or a combination thereof based, at least in part, on the first similarity score, the second similarity score, or a combination thereof.

15. The apparatus of claim 14, wherein tuning the first weight and the second weight further comprising:
maximize a total score based, at least in part, on the matching of the one or more combinations of the first attribution category and the second attribution category.

16. The apparatus of claim 14, wherein tuning the first weight and the second weight further comprising:
minimize the total score based, at least in part, on determining the one or more combination of the first attribution category and the second attribution category is incorrect.

17. The apparatus of claim 16, further comprising:
align automatically the first feature space and the second feature space based, at least in part, on the total score.

18. A non-transitory computer-readable storage medium for generating a transformation space to compare feature spaces for digital map making, carrying one or more sequences of one or more instructions which, when executed by one or more processors, cause an apparatus to at least perform the following steps:
determining a first feature space represented by a first vector or matrix comprising one or more first mappable geographic features of a geographic area detected from raw sensor data and classified by a feature detector into a first attribution category, wherein the one or more first mappable geographic features of the geographic area are stationary;
determining a second feature space represented by a second vector or matrix comprising one or more second mappable geographic features of the geographic area detected from the raw sensor data and classified by the feature detector into a second attribution category, wherein the one or more second mappable geographic features of the geographic area are stationary;
calculating a first similarity score for the first feature space based on a first distance metric applied to the one or more first mappable geographic features, and a second similarity score for the second feature space based on a second distance metric applied to the one or more second mappable geographic features; and
determining the transformation space comprising a first weight to be applied to the first similarity score and a second weight to be applied to the second similarity score based on matching one or more combinations of the first attribution category and the second attribution category.

19. The non-transitory computer-readable storage medium of claim 18, further comprising:
processing the one or more first mappable geographic features, the one or more second mappable geographic features, or a combination thereof using the transformation space to create the digital map.

20. The non-transitory computer-readable storage medium of claim 18, wherein the first weight and the second weight perform a direct linear transformation (DLT) of the first feature space and the second feature space.

* * * * *